United States Patent [19]
Dillingham

[11] 3,885,160
[45] May 20, 1975

[54] PULSED NEUTRON SOURCE WELL LOGGING SYSTEM

[75] Inventor: Mat E. Dillingham, Fort Worth, Tex.

[73] Assignee: The Western Company of North America, Fort Worth, Tex.

[22] Filed: Sept. 10, 1973

[21] Appl. No.: 395,539

Related U.S. Application Data

[63] Continuation of Ser. No. 194,423, Nov. 1, 1971, abandoned.

[52] U.S. Cl. ............... 250/499; 250/270; 250/494
[51] Int. Cl. .......................................... G01t 3/00
[58] Field of Search ........... 250/499, 502, 270, 485, 250/494

[56] References Cited
UNITED STATES PATENTS

| | | | |
|---|---|---|---|
| 2,275,748 | 3/1942 | Fearon | 250/270 |
| 3,389,257 | 6/1968 | Caldwell et al. | 250/499 |
| 3,400,269 | 9/1968 | Holm | 250/499 |
| 3,751,668 | 8/1973 | Coleman | 250/502 |

*Primary Examiner*—Harold A. Dixon
*Attorney, Agent, or Firm*—Mason, Kolehmainen, Rathburn & Wyss

[57] ABSTRACT

A pulsed neutron source has a chamber containing a plurality of alpha emitting strips and beryllium targets coaxially mounted. A pulsed source is provided by rotation of the target to on-off positions along with electromagnetic and magnetic devices for positive locking and rotation.

10 Claims, 8 Drawing Figures

INVENTOR:
MAT E. DILLINGHAM

BY Mason, Kolehmainen
Rathburn & Wyss
ATTORNEYS

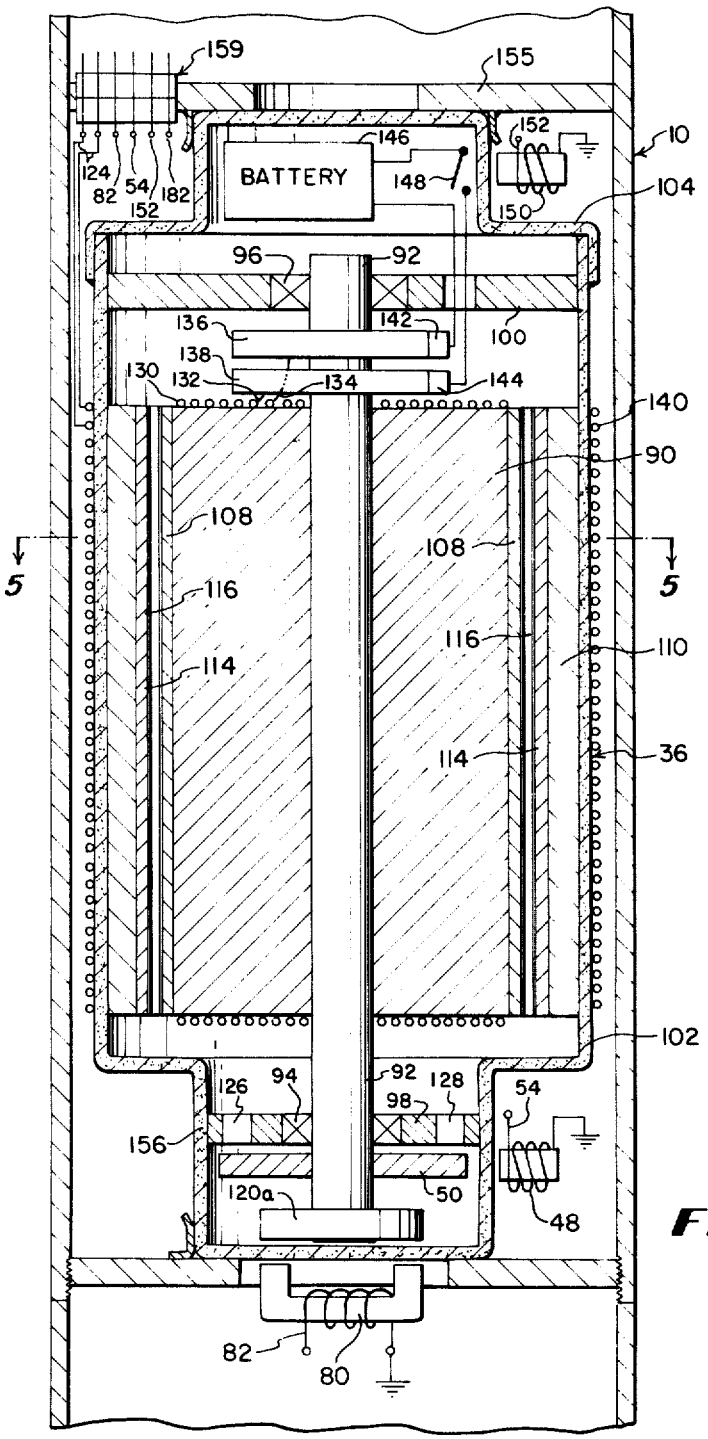
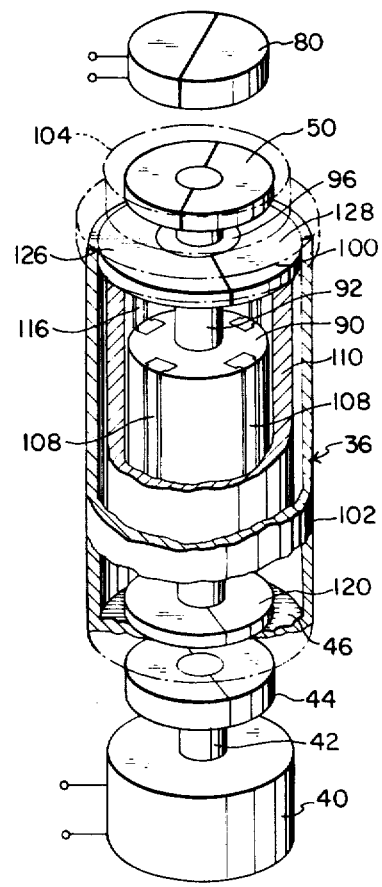
FIG. 2
FIG. 4
INVENTOR:
MAT E. DILLINGHAM
BY Mason, Kolehmainen
Rathburn & Wiess
ATTORNEYS

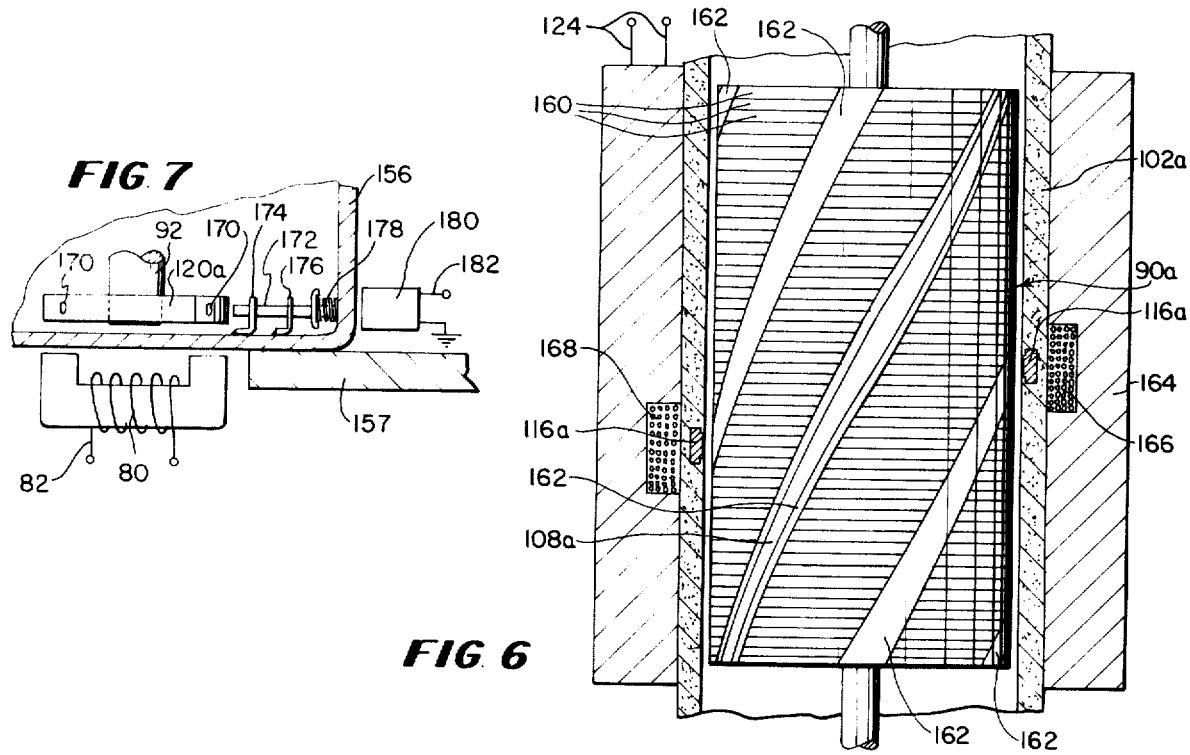
FIG. 7
FIG. 6
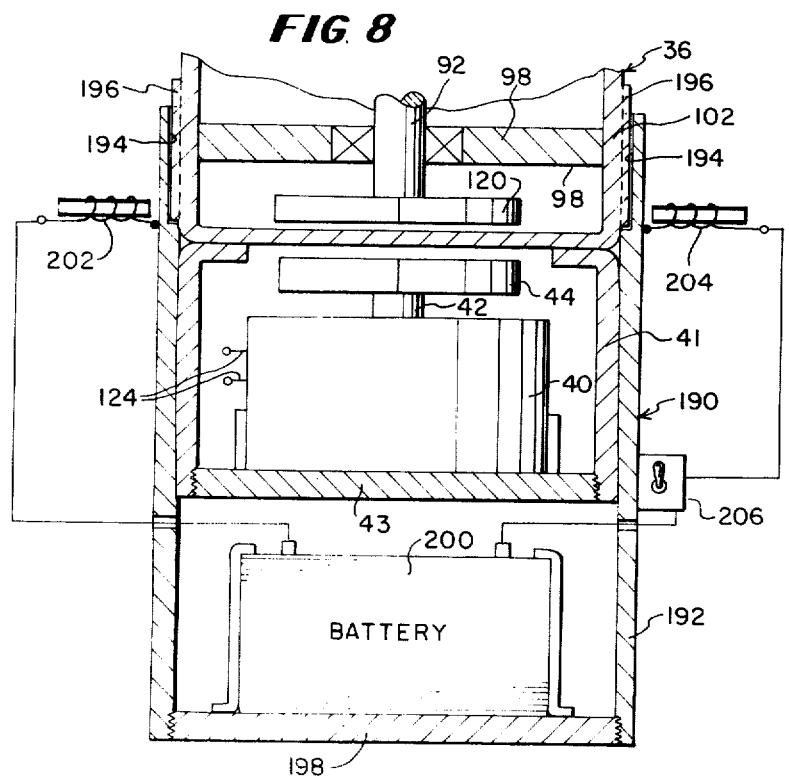
FIG. 8
INVENTOR:
MAT E. DILLINGHAM
BY Mason, Kolehmainen
Rathburn & Wyss
ATTORNEY

PULSED NEUTRON SOURCE WELL LOGGING SYSTEM

This is a continuation of application Ser. No. 194,423 filed Nov. 1, 1971, and now abandoned.

The present invention relates to radioactivity well logging systems, and, more particularly, to a well logging system of the type that employs a pulsed neutron source to emit periodic bursts of fast neutrons which are employed to irradiate the surrounding formations, various types of measurements being made during the intervals between such neutron bursts.

Various arrangements have been heretofore proposed to provide a pulsed neutron source by means of an alpha particle emitter, such as polonium, which periodically irradiates a target material, such as beryllium, to develop the desired bursts of fast neutrons. These arrangements are shown, for example, in Fearon U.S. Pat. No. 2,275,748, Youmans U.S. Pat. No. 3,379,884, Goodman U.S. Pat. No. 3,461,291, Youmans U.S. Pat. No. 3,379,882, Mills U.S. Pat. Nos. 3,373,280 and 3,413,473 and Allen, et al. U.S. Pat. No. 3,413,470.

In these prior art arrangements a rotatable shutter is usually positioned between the polonium source and t he beryllium target, the alpha particles from the polonium source being directed to strike the target when exposed through an opening in the shutter and being blocked from the target material by the intervening portions of the shutter. While these mechanical shutter arrangements are capable of producing periodic bursts of fast neutrons, they have in general been found to be unsatisfactory in commercial logging due to the fact that the intensity of the fast neutron bursts is very small. This is due primarily to the fact that alpha particles emitted by the polonium have very little penetrating power and hence have lost most of their energy by the time they strike the target material so that the resultant burst of fast neutrons is of relatively low intensity.

In Caldwell, et al. U.S. Pat. No. 3,389,257 an arrangement is proposed wherein a plurality of source-target pairs are positioned on opposite sides of a mechanically rotatable shutter and all of these source-target pairs are simultaneously exposed through suitable shutter openings to develop a more intense source of fast neutrons. Also, the Caldwell, et al. patent proposes to provide an atmosphere of helium between the polonium sources and the corresponding beryllium targets to increase the intensity of the fast neutron bursts. However, the arrangement in Caldwell, et al. U.S. Pat. No. 3,389,257 still provides only a relatively weak burst of fast neutrons because of the fact that the source-target pairs are positioned in a horizontal plane and hence are of relatively small dimensions even though a relatively large diameter unit is employed. Also, in this arrangement the source-target spacing is relatively large to accommodate the rotating shutter therebetween.

In the Caldwell, et al. patent the driving motor for the shutter is positioned in the same housing as the polonium sources. However, under requirements established by the Atomic Energy Commission radioactive polonium sources must be contained in capsules or modules having a pressure integrity of 20,000 pounds per square inch. Accordingly, the leads for the driving motor of Caldwell, et al., as well as the leads for the disclosed sync pulse generator must be brought out of the housing through seals that will withstand 20,000 pounds per square inch. In the alternative, the polonium sources themselves must be contained within capsules which will withstand such pressure, which would reduce the intensity of the alpha particles available to strike the target.

It is, therefore, an object of the present invention to provide a new and improved pulse neutron source arrangement wherein one or more of the above-mentioned disadvantages of the prior art arrangements are eliminated or minimized.

It is another object of the present invention to provide a new and improved pulsed neutron source arrangement which meets AEC requirements for pressure integrity and provides relatively intense bursts of fast neutrons in an efficient and economical manner.

It is still another object of the present invention to provide a new and improved pulsed neutron source arrangement wherein a plurality of elongated strips of alpha emitting material are positioned in face-to-face relation with corresponding strips of target material, such as beryllium, which are carried by a rotatable member, all of said source and target strips being contained within a sealed chamber which is field replaceable as a unit in a simple and reliable manner.

It is a further object of the present invention to provide a new and improved pulsed neutron source arrangement wherein a plurality of alpha emitting sources and a corresponding series of targets are positioned within a sealed chamber, and an electromagnetic drive arrangement is employed for rotating the target strips relative to the source strips through one wall of the sealed housing, whereby the sealed unit may be readily replaced as a unit in the field.

It is another object of the present invention to provide a new and improved pulsed neutron source arrangement wherein a plurality of alpha emitting sources and corresponding targets are provided within a Sealed chamber and an electromagnetic arrangement is employed both to rotate the targets relative to the sources within the chamber and to derive a synchronizing pulse through one wall of the chamber which may be employed accurately to determine the off intervals between neutron bursts.

It is still another object of the present invention to provide a new and improved pulsed neutron source arrangement wherein a plurality of alpha emitting sources and corresponding targets are enclosed with a sealed chamber and facilities external to said chamber are provided for locking all of the targets in face-to-face relationship with the sources so as to provide a continuously operative fast neutron source.

It is a further oobject of the present invention to provide a new and improved pulsed neutron source arrangement which is of relatively small diameter and is adapted to be employed in logging slim boreholes or through production tubing in cased boreholes.

It is another object of the present invention to provide a new and improved pulsed neutron source arrangement wherein a plurality of alpha particle emitting sources and corresponding targets are enclosed within a sealed chamber and cooperating windings, one within said chamber and one without, are employed to cause relative movement between said sources and said targets within said chamber.

Briefly, in accordance with one aspect of the invention, a pulsed neutron source well logging system according to the present invention comprises a plurality of elongated strips of alpha emitting material, such as polonium, which are positioned to extend along the inside walls of a sealed cylindrical housing. A corresponding plurality of target strips are mounted on a rotor member which is rotatably mounted within the sealed housing in such manner that the target strips are brought into extremely close face-to-face relationship with the source strips as said member is rotated. The wall of the sealed housing is of nonmagnetic material and an electromagnetic clutch drive mechanism including a motor external to the sealed housing and a magnetic driven member within the housing are employed to rotate the target carrying rotor at the required speed to produce bursts of fast neutrons at the desired periodic intervals. The sealed housing may be of relatively small diameter for logging slim boreholes because the intensity of the fast neutron bursts is determined by the length of the source and target strips. Also, since no connections are made through the sealed housing, troublesome high pressure seals are avoided and the sealed unit may be readily replaced in the field.

In accordance with a further aspect of the invention, either a mechanical locking arrangement, or an electromagnetic arrangement which fits over the end of the sealed chamber and cooperates with a permanent magnet carried by the rotor, may be employed to lock the rotor shaft positively in a position such that the target strips carried thereby are intermediate the polonium source strips and hence are not irradiated thereby. As a result, the sealed chamber of the present invention may be positively locked in the off position, once the external driving motor is de-energized, so that the sealed housing can be handled and removed as desired by personnel in the field without danger.

In accordance with a further aspect of the invention, a rotatable permanent magnet within the sealed housing is also employed in conjunction with a sensing coil positioned outside the nonmagnetic wall of the housing to develop a synchronizing signal corresponding to rotation of the target bearing rotor while still permitting the sealed housing to be readily removed in the field.

In accordance with another aspect of the invention, the target bearing rotor within the sealed housing also carries a rotor winding which cooperates with a stator winding wound around the exterior of the sealed housing, this rotor and stator housing acting as a motor so that the target bearing rotor within the sealed housing is rotated at the desired speed without requiring the connection of any lead wires through the sealed chamber walls. A starting battery may also be positioned within the sealed housing and is connected to the rotor winding within the housing by means of an electromagnetic actuator which is operative through the nonmagnetic wall of the housing. In the alternative, an induction motor arrangement may be employed in which the rotor winding and starting battery are eliminated.

The invention, both as to its organization and method of operation, together with further objects and advantages thereof, will best be understood by reference to the following specification taken in connection with the accompanying drawings in which:

FIG. 2 is an exploded view of the component parts of the pulsed neutron source of the system of FIG. 1;

FIG. 4 is a longitudinal sectional view of an alternative pulsed neutron source arrangement according to the present invention;

FIG. 6 is a fragmentary sectional view, similar to FIG. 4, of an alternative embodiment of the invention;

FIG. 7 is a fragmentary sectional view of a mechanical locking arrangement according to the present invention; and FIG. 8 is a sectional front view of an electromagnetic locking arrangement which may be used in accordance with the present invention.

Figure 1:
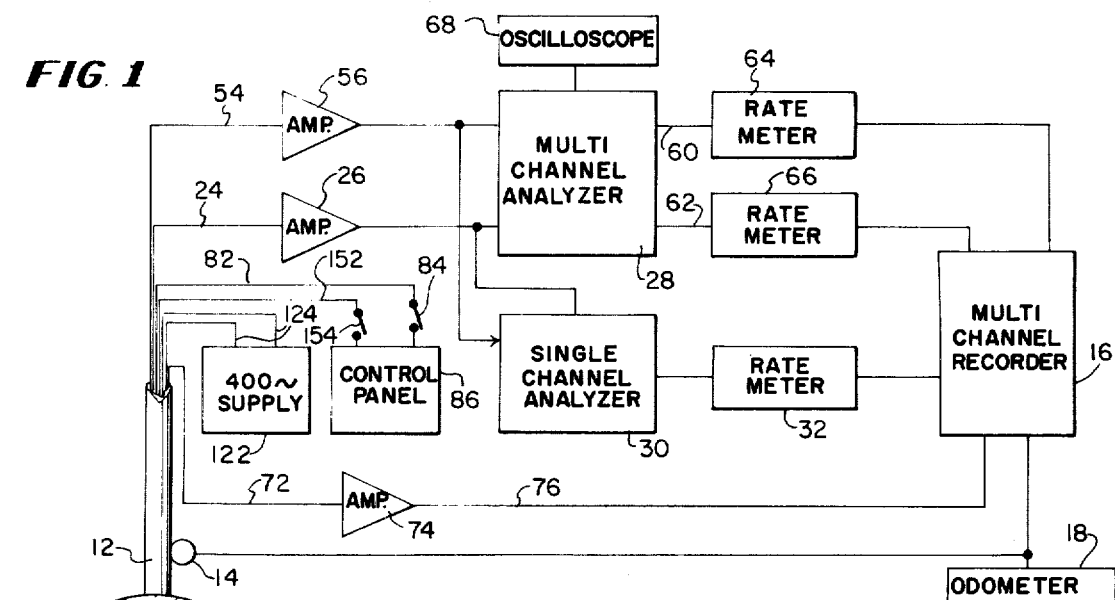
FIG. 1 is a diagrammatic illustration of the pulsed neutron source well logging system of the present invention.
Figure 3:
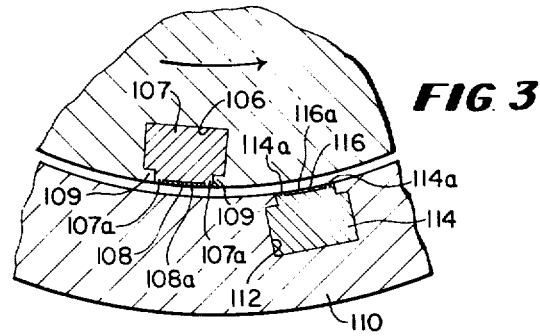
FIG. 3 is a fragmentary sectional view taken along the lines 3—3 of FIG. 1.

Referring now to the drawings, and more particularly to FIGS. 1, 2 and 3, thereof, the present invention is therein illustrated in conjunction with a radioactivity well logging system which comprises a subsurface unit indicated generally at 10 which is arranged to be raised or lowered within a cased or uncased bore hole by means of a multi conductor cable 12. As the subsurface unit 10 is raised and lowered within the bore hole a depth measauring sheave 14 in contact with the cable 12 may be employed to drive a multi-channel recorder 16 and also an odometer 18 to provide a general indication of the depth at which the log is being made.

Within the subsurface unit 10 a radiation detector 20 which may comprise a slow neutron, epithermal neutron or gamma ray detector of any suitable type as will be described in more detail hereinafter, is positioned within an upper portion 22 of the housing 10, is energized by means of a suitable power supply (not shown) in the portion 22 and the output signal from the detector 20 is connected through a suitable shaper-amplifier in the portion 22 and over the cable conductor 24 to a signal amplifier and discriminator 26 at the surface, the output of which is supplied to a multi-channel time spectrum analyzer 28. A single channel time spectrum analyzer 30 is also connected to the output of the signal amplifier and discriminator 26 and supplies a signal corresponding to the total pulse spectrum output of the detector 20 to a total counting rate meter 32.

In the lower portion 34 of the subsurface unit 10 there is provided a pulsed neutron source arrangement comprising a sealed chamber indicated generally at 36 which is secured to the inturned upper flange 38 of a motor housing 41. A bottom plate 43 is threaded into the bottom end of the housing 41 and supports a driving motor 40 to the shaft 42 of which carries a magnetic clutch member 44 positioned immediately below the bottom wall 46 of the sealed chamber 36. The member 44 may comprise either a permanent magnet or an electromagnet energized through suitable slip rings, as will be readily understood by those skilled in the art. The housing 41 and sealed chamber 36 are held in place by a member 45 which is threaded into the outer wall of the unit 10.

As will be described in more detail hereinafter, a sync pulse generator 48 is positioned outside of the sealed chamber 36 but immediately adjacent a rotatable permanent magnet 50 which is positioned on the upper end of a rotatable shaft 92 mounted within the sealed chamber 36. This sync pulse generator produces a synchronizing pulse which is correlated to the burst of fast neutrons developed within the sealed chamber 36 and is transmitted over the cable conductor 54 to the earth's surface where it is amplified and shaped in a unit 56 the output of which is coupled to the multi-channel time spectrum analyzer 28 so as to control the selection of different portions of the pulse spectrum following each burst of fast neutrons. This synchronizing pulse is also applied to the single channel time spectrum analyzer 30 as to permit measurement of the total pulse spectrum following each burst of fast neutrons.

The bursts of fast neutrons developed within the chamber 36 preferably have a duration of somewhat less than 500 microseconds and occur at a repetition rate of approximately 533 bursts per second. The intervening time intervals between fast neutron bursts are employed to measure any of the radiation phenomena taking place during these intervals which provides useful information regarding the nature and characteristics of the surrounding formations. For example, the radiation detector 20 may comprise a thermal neutron detector, and may be either a gas filled counter, such as a helium 3 counter or a scintillation crystal type of detector employing a lithium iodide crystal, as will be readily understood by those skilled in the art. With such an arrangement the thermal neutron lifetime decay curve can be determined during the intervening intervals between fast neutron bursts by setting two of the time channels of the multi-channel analyzer 28 to detect the counts per second occurring at two different points on the decay curve following each burst of fast neutrons. Thus, the setting of one time channel may be made to correspond to a window of from 900 to 1,200 microseconds following each initiation of a fast neutron burst and the second window may be chosen to measure the pulses occurring from 1,060 microseconds to 1,360 microseconds. The output of these two time channels of the analyzer 28 are supplied over the conductors 60 and 62, respectively to counting rate meters 64 and 66 and the output of the counting rate meters 64 and 66 are arranged to energize the corresponding channel pens of the multi-pen recorder 16 so that a log corresponding to the number of counts per second in each selected window along the thermal lifetime decay curve is displayed on the recorder 16. If desired, an oscilloscope 68 may be connected to the time spectrum analyzer 28 so as to provide a visual indication of the pulse height spectrum signal output of the radiation detector 20, as will be readily understood by those skilled in the art. The output of the counting rate meter 32 which corresponds to the total counts in pulses per second during and between neutron bursts, may also be applied to a separate channel of the multi-pen recorder 16 so that this information is also recorded in correlation with depth.

In order to provide an accurate indication of depth, a collar finder unit 70 may be positioned in the subsurface unit 10 and is arranged to transmit a collar finder signal over the conductor 72 to the earth's surface where it is supplied to a collar finder signal amplifier 74 which provides a suitable output signal on the conductor 76 corresponding to the traversal of each casing collar by the subsurface unit 10, as will be readily understood by those skilled in the art.

In accordance with an important aspect of the present invention, facilities are provided for controlling the neutron generator within the chamber 36 so that it is in a continuously on position, thereby permitting a different type of log to be made simply by controlling the neutron generating source from the earth's surface.

More particularlay, an electromagnet 80 is provided in the subsurface unit 10 immediately above the top wall of the sealed chamber 36 and in close proximity to the rotatable permanent magnet 50 positioned therewithin. The electromagnet 80 is arranged to be energized from the conductor 82 by means of a switch 84 on the control panel 86 within the logging truck. When the switch 84 is closed a suitable potential is applied to the electromagnet 80 so that the neutron source within the chamber 36 is continuously on and emits a continuous stream of fast neutrons rather than emitting fast neutrons in intermittent bursts. Accordingly, when the switch 84 is closed, and the radiation detector 20 comprises a thermal neutron detector, as described heretofore, a standard thermal neutron log may be made utilizing the same down hole equipment as previously described to log a thermal lifetime decay log. In the alternative, the radiation detector 20 may comprise a gamma ray detector, of either the Geiger type or the scintillation icounter type and analysis of the gamma rays of capture resulting from irradiation of the formations with fast neutrons may be effected by means of the multi-channel spectrum analyzer 28. Thus, one or more of the channels of this analyzer may be set to correspond to specific elements, such as chlorine, within the formation, and a spectrum analysis log made with either the continuously emitting neutron source or when bursts of fast neutrons are developed within the chamber 36.

The neutron source arrangement of the present invention is also adapted to function with subsurface units 10 wherein the radiation detector 20 comprises an epithermal neutron detector. In such instances, the electromagnet 80 is energized from the surface by closure of the switch 84 so that a continuously emitting neutron source is employed to irradiate the formations adjacent the unit 10 and a continuous epithermal neutron log can be made.

Considering now in more detail the arrangement of the present invention employed to provide either a succession of fast neutron bursts or a continuously emitting neutron source, a cylindrical rotor 90 is carried by a rotor shaft 92 which is rotatably mounted in bearing portions 94 and 96 of a pair of transverse partition members 98 and 100 which are secured to the cylindrical wall portion of a cup-shaped housing member 102 of the chamber 36 at either end thereof. The sealed chamber 36 must be nonmagnetic and must also be essentially transparent to the fast neutrons which are developed therewithin. However, the sealed chamber 36 must have a pressure integrity of approximately 20,000 pounds per square inch and be able to withstand this pressure without rupturing to conform to the AEC standards with respect to radiation sources of the type employed to develop fast neutrons in accordance with the present invention. Accordingly, the housing portion 102 may comprise a stainless steel casing within which the transverse bearing partitions 98 and 100 are secured by a suitable welding operation, or the like. A cap member 104, which may also be of stainless steel, is secured to the upper edge of the cup-shaped member 102 by a suitable welding operation after the components have been assembled within the member 102 so that a completely sealed neutron generating arrangement is provided which will meet AEC requirements and yet may be readily replaced in the field by a similar unit when the intensity of the radiation sources within the chamber 36 has decreased to a predetermined value.

In accordance with a further important aspect of the invention the rotor 90 is provided with a series of longitudinally extending grooves 106 (FIG. 3) which extend parallel to the rotational axis of the rotor 90 and are equally spaced about the periphery thereof. A plurality of backing strips 107 are positioned within the grooves 106 and have bonded thereto thin foil strips of suitable target material, such as beryllium, or the like. The grooves 106 are undercut to form shoulders 109 which hold the backing strips 107 in place as the rotor 90 rotates. A cylindrical stator member 110, which may also be of stainless steel, is secured between the end partitions 98 and 100 within the chamber 36 and is provided with longitudinally extending undercut grooves 112 on the inner periphery thereof. Within each groove 112 there is positioned a backing strip 114 of a material suitable for supporting a thin layer of alpha emitting material 116 along the inner face of the strip 114, as illustrated in FIG. 3. For example, the backing strip 114 may comprise platinum and the layer 116 of alpha emitting material may comprise a metallic foil of Polonium 210 which is bonded or otherwise secured to the inner face of the platinum backing strip 114. The target strips 108 are provided with an arcuate outer surface 108a which is adapted to conform to the arcuate inner surface 116a of the polonium foil strips 116 so that as the rotor 90 is rotated all of the target strips 108 are simultaneously brought into extremely close face-to-face relationship with one of the source strips 116. With such an arrangement the target strips 108 may be spaced from the source strips 116 by only a distance of from 0.005 to 0.01 inch when in said face-to-face relationship so that the alpha particles emitted from the surface of the source strips 116 will have relatively high energy when they strike the adjacent surface of the target strips 108 due to the fact that these alpha rays have had to travel through only a relatively short distance in the atmosphere within the sealed chamber 36. Furthermore, since the length of the target strips 108 and the source strips 116 may be chosen to give any desired intensity of fast neutrons, the space between the target strips 108 and the source strips 116 when in said face to face relationship, i.e., the atmosphere within the sealed chamber 36, need not be of a special gas which will have low attenuation for alpha particles. Accordingly, the atmosphere within the sealed chamber 36 may be air at atmospheric pressure and the complexities attendant to the introduction of a special gas into this sealed chamber are avoided. However, if desired, the space within the sealed chamber 36 may be evacuated after the cap 104 has been welded to the housing 102 so that the alpha particles emitted by the source strips 116 will be attenuated less in travelling to the target strips 108, thereby further increasing the efficiency of the pulsed neutron source arrangement of the present invention.

In order that each neutron burst will be sharply defined and hence occupy a minimum portion of the available time spectrum, shielding means are provided for both the target and source strips to prevent alpha particles from striking the target strips until the target strips 108 have been moved into close proximity to the source strips 116. Thus, the backing strips 107 have portions 107a adjacent the sides of the target strips 108 which extend outwardly to the surface 108a and prevent alpha particles from striking the target strips 108 when the rotor is positioned as shown in FIG. 3. Likewise, the backing strips 114 have similar shielding portions 114a which provide a similar shielding effect on the alpha particles emitted by the strips 116. In this connection, it will be understood that the source strips 116 may be positioned on the rotor 90 and the target strips 108 mounted on the stationary member 110 insofar as the basic principles of the invention are concerned.

As stated above, the length of the target strips 108 and source strips 116 may be chosen so as to give the desired intensity of fast neutron bursts. However, this length can be relatively short and still provide a rather intense neutron source. For example, if the fast neutron bursts are to have an intensity of $6 \times 10^7$ neutrons per second, the length of the strips 108 and 116 when four strips spaced 90° apart are employed will still be only in the order of 2 to 3 inches long. As a result, the entire sealed chamber 36 can be relatively small as measured along the length of the housing 10. Furthermore, the duration of the neutron bursts may be decreased, with a consequent increase in logging speed, while maintaining the same intensity of neutron flux by simply making the source strips 116 and target strips 108 twice as long and half as wide. For example, if a neutron burst having a maximum intensity of $6 \times 10^6$ neutrons per second is obtained with strips which are 2 mm. wide and 2½ inches long, this same intensity of neutron flux can be obtained in a neutron burst which is approximately half as long in duration by using strips which are 1 mm. wide and 5 inches long. It is also pointed out that the neutron source arrangement of the present invention may readily be made sufficiently intense that it can replace high intensity chemical neutron sources, such as americium-beryllium, which are continuously emitting and present great handling problems to insure safety to personnel. Thus, if a source having an intensity of $1 \times 10^7$ neutrons per second is required, a set of four strips 108 and 116 may have a width of 2 mm. and a length somewhat less than 5 inches. When longer strip lengths are required, the rotor 90 may be divided into two sections spaced along the shaft 92 and an intermediate bearing partition, similar to the partitions 98 and 100, may be employed to support the shaft 92 at the middle so that the desired close spacing between target and source strips can be maintained. Such an intense neutron source is particularly suitable for chlorine logging operations in which the neutron source may either be pulsed or operated in the continuously on position, as discussed heretofore.

Considering now the manner in which the rotor 90 is driven from the external driving motor 40, a permanent magnet 120 is positioned on the bottom end of the rotor shaft 92 below the bearing partition 98 and immediately adjacent the bottom wall 46 of the cup-shaped housing member 102. The magnetic driving element 44 which is carried by the motor shaft 42 is also positioned relatively close to this wall on the outside thereof so that when the motor 40 is energized, the rotor 90 within the sealed housing 36 is rotated at the desired speed. In this connection, it will be understood that the permanent magnet 120 and the magnetic drive member 44 will function to couple the shafts 92 and 42 together through the stainless steel wall 46 which is essentially nonmagnetic. Preferably, the motor 40 drives the rotor 90 at a speed of approximately 8,000 rpm and a 400 cycle alternating current power supply 122 may be provided at the earth's surface which develops a suitable energizing voltage which is supplied over the conductors 124 to the motor 40 in the subsurface unit 10.

As discussed generally heretofore, the sealed chamber 36 is provided with internal facilities for insuring that the rotor 90 is locked in an intermediate position in which the target strips 108 are positioned outside the range of alpha particles emitted by the source strips 116. To this end, the bearing partition 100 may comprise permanent magnet sections 126 and 128 which cooperate with the permanent magnet 50 on the upper end of the rotor shaft 92 to lock the rotor in the off or nonemitting position when the motor 40 is de-energized. Accordingly, the sealed chamber 36 may be removed as a unit without danger to operating personnel since the rotor 90 is held in the intermediate nonemitting position by virtue of the above-described permanent magnets. On the other hand, it is also possible to override the attraction between the magnets 50 and 126, 128 by means of the electromagnet 80 which is positioned outside of and immediately adjacent the top wall of the cap 104. Thus, when the electromagnet 80 is energized by closure of the switch 84, a magnetic field is established thereby which overcomes the force of the permanent magnets 126, 128 and attracts the magnet 50 to a rotor position in which the targets 108 are in exact face-to-face relationship with the source strips 116. Accordingly, as long as the electromagnet 80 is energized, a continuously emitting neutron source is provided and the various types of logs described heretofore can be run.

Figure 5:
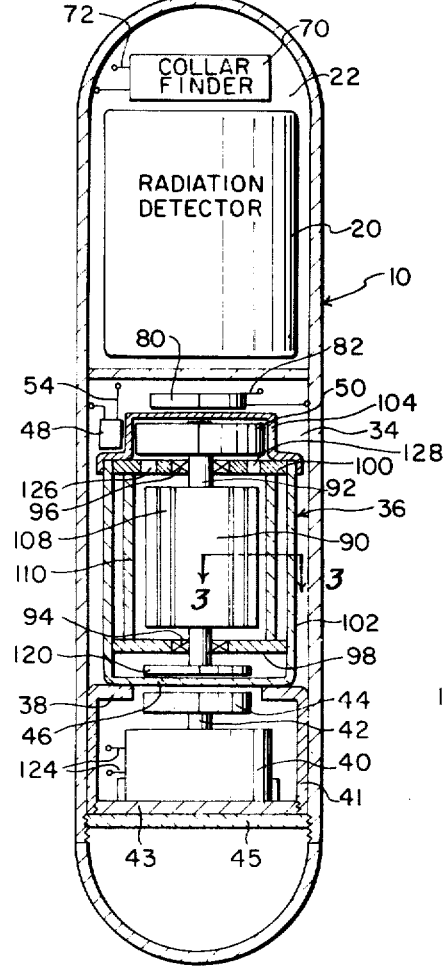
FIG. 5 is a sectional view taken along the lines 5—5 of FIG. 4.
Figure 5:
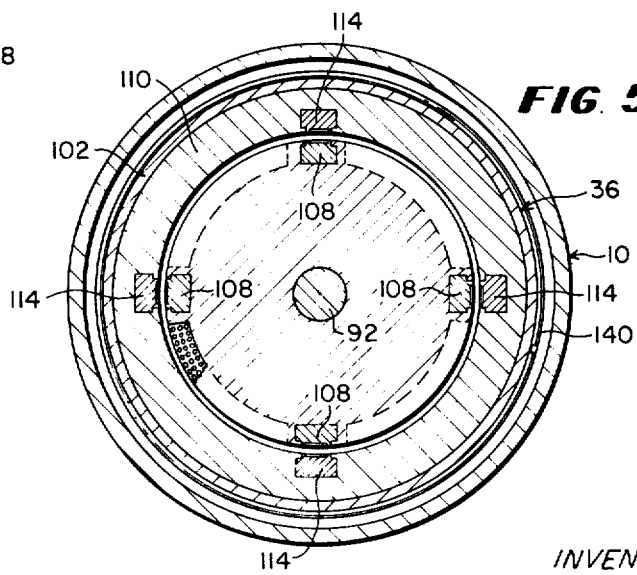

In the alternative embodiment of the present invention shown in FIGS. 4 and 5 of the drawings, an arrangement is provided whereby the driving motor 40 of the embodiment of FIG. 1 is incorporated into and made a part of the sealed unit which develops bursts of fast neutrons while still providing the pressure integrity requireid by the AEC for radiation sources such as Polonium 210. More particularly, in the embodiment of FIGS. 4 and 5, the rotor 90 is provided with a rotor winding 130 which is wound about the rotor 90 between the target strips 108. The lead wires 132 and 134 of the rotor winding 130 are connected to slip rings 136 and 138 which are positioned on and carried by the upper end of the rotor shaft 92. The cup-shaped housing member 102 acts as the support for a stator winding 140 of enamelled wire which is wound in the opposite direction from the rotor winding 130 around the outside of the housing member 102. The slip rings 136 and 138 are connected through brushes 142 and 144 to the terminals of a battery 146 through a magnetically actuated on-off switch 148 which is positioned immediately adjacent one wall of the cap member 104 of the sealed housing 36. An actuating coil 150 is positioned outside this wall of the cap 104 and is arranged to be energized from the earth's surface over the conductor 152. Accordingly, when the stator winding 140 is energized from the power source 122 at the earth's surface and the switch 154 on the control panel 86 is closed, the coil 150 causes the switch 148 to close and the voltage of battery 146 is applied through the slip rings 136 and 138 to the rotor winding 130 to provide starting torque therefor. By virtue of motor action between the rotor winding 130 and stator winding 140, which cooperate through the wall of the nonmagnetic housing member 102, the rotor shaft 92 is driven at the desired speed.

Accordingly, the target strips 108 carried thereby are rotated relative to the polonium source strips 116 and bursts of fast neutrons are produced in the manner described in detail heretofore in connection with the embodiment of FIGS. 1 to 3, inclusive. In this connection, it is pointed out that the wall portion of the housing 102 on which the winding 140 is wound may, if desired, comprise an alumina ceramic, which can be bonded with epoxy and withstand the required temperature and pressure, to reduce eddy current losses in this wall portion. This alumina ceramic wall portion may be bonded to the stainless steel end cap 104, or, in the alternative this cap may also be made of alumina ceramic.

In the embodiment of FIGS. 4 and 5, the bottom portion 156 of the cup-shaped housing member 102 is of reduced diameter and the permanent magnet 50 which is employed to develop synchronizing pulses is positioned on the bottom end of the rotor shaft 92 within the housing portion 156. Accordingly, the synchronizing pulse pickup coil 48 can be positioned outside the housing portion 156 to develop synchronizing pulses in response to rotation of the shaft 92 without increasing the overall diameter of t he unit so that an extremely small diameter pulsed neutron source arrangement is provided. Also, the permanent magnet portions 126 and 128 are provided in the bottom partition 98 and cooperate with the magnet 50 to lock the rotor shaft 92 in the source-off position when the stator winding 140 is de-energized.

In the embodiment of FIGS. 4 and 5 the electromagnet 80 is positioned below the bottom end of the sesaled chamber 36 and cooperates with the permanent magnet 120a positioned inside the housing to lock the rotor shaft in the source-on position when the electromagnet 80 is energized by closure of the switch 84. The sealed chamber 36 is held against an upper partition 155 by means of a bottom plate 157 which threads into the housing of the unit 10. All connections to the chamber 36 may be established by means of a quick disconnect plug and socket arrangement 159, mounted in the partition 155, as the unit 36 is inserted into the unit 10. A similar arrangement may be employed in the embodiment of FIGS. 1 to 3, also.

In connection with both the embodiment of FIGS. 1 to 3, and the embodiment of FIGS. 4 and 5, it is pointed out that the sealed chamber 36 and component parts therein may be readily constructed of inexpensive parts. However, the polonium source strips 116 deteriorate rapidly and must be replaced every five or six months. Accordingly, the sealed chamber may readily be replaced by a similar unit and the replaced unit may be disposed of in accordance with AEC requirements for disposing of radioactive material. Such procedure may in certain instances be less expensive than attempting to open up the sealed chamber, remove the polonium from all of the exposed surfaces and replace the polonium source strips, particularly in connection with the embodiment of FIGS. 1 to 3 in which the driving motor and associated electrical circuits are not a part of the sealed chamber.

The alternative embodiment shown in FIG. 6 may be employed in the event it is desired to eliminate the battery 146, slip rings 136, 138 and actuating coil 150 of the embodiment of FIGS. 4 and 5. Referring to FIG. 6, a 400 cycle induction motor arrangement is provided wherein the rotor 90a comprises a series of soft iron star-shaped washers 160 which are stacked on the shaft 92a in a spiral manner so that spiral grooves are formed in the periphery of the rotor. These grooves are filled with aluminum 162 and the rotor 90a may have six such grooves formed about the periphery thereof, if a six pointed star washer construction is utilized. In the embodiment of FIG. 6 three of these aluminum filled grooves are used to support backing strips for the spiral target strips 108a which cooperate with source strips 116a carried by backing strips which are mounted in corresponding spiral grooves formed on the interior wall of the alumina ceramic housing member 102a. It will be understood that the backing strips for the target strips 108a and source strips 116a may have shielding shoulders as described heretofore in connection with FIG. 3. Accordingly, no neutron burst is produced until the spirally extending target strips 108a are simultaneously brought into face-to-face relationship with the spirally extending source strips 116a, as described heretofore.

A stator member 164 is positioned around the inside of the housing 102a and is provided with internal spiral grooves in which are wound stator windings 166, 168. The stator windings 166, 168 are energized from the 400 cycle power supply 122, over the conductors 124, and the rotor 90a is driven at the desired speed by induction motor action, as will be readily understood by those skilled in the art. In this connection, it will be understood that since only three source strips 116a and target strips 108a are used in the embodiment of FIG. 6, the rotor 90a must be driven at a higher speed than 8,000 rpm if the same neutron burst repetition rate as obtained in FIGS. 1 to 3 is desired. Also, these strips will be somewhat longer than the corresponding strip in FIGS. 1 to 3 if the same intensity neutron bursts are required. In the alternative, a conventional induction motor, the rotor and stator of which are separated only by the alumina ceramic housing 102a, may be positioned within this housing and a separate rotor and stator, similar to that described in connection with FIGS. 1 to 3 and carrying straight vertically extending target strips 108 and source strips 116, may be rotatably supported within the housing 102a in any suitable manner and axially connected to the rotor shaft of the separate induction motor.

In the embodiments described thus far, the target strip carrying rotor is held in a non neutron emitting or off position by means of the permanent magnet 50 on the shaft 92 which cooperates with the permanent magnet portions 126, 128 in the bearing partition 100. Under some conditions a more positive safety locking arrangement is desirable for handling and storage of the neutron source, particularly in instances where a relatively intense flux of neutrons is produced if the target strips 108 are accidentally moved into face-to-face relationship with the source strips 116. In FIG. 7 a positive mechanical locking arrangement is provided for securing the shaft 92 in the desired off position with the target strips 108 positioned away from the adjacent source strips 116 so that no neutrons are developed thereby. Referring to this figure, the permanent magnet 120 is provided with four holes 170 extending inwardly from the periphery thereof, the holes 170 being positioned corresponding to the four off positions of the rotor 90. A pin 172, which is slidably mounted in the brackets 174 and 176 mounted on the bottom wall of the housing portion 156, is positioned so that the end of the pin 172 will enter one of the holes 170 by virtue of the force of a biasing spring 178 positioned between the flanged end of the pin 170 and the adjacent wall portion 156. Accordingly, when the rotor shaft 92 is de-energized and is brought to the correct position by the magnets 50 and 126, 128 (in the embodiment of FIGS. 4 and 5) the pin can enter one of the holes 170 and positively locks the rotor shaft 92 against further rotation. The sealed chamber may then be removed from the subsurface unit 10, handled and stored between logging operations with complete assurance that no fast neutrons will be emitted during such operations. After the sealed chamber has been placed in a logging unit and it is desired to rotate the shaft 92, a coil 180 positioned outside the housing portion 156 is energized over the conductor 182 from the control panel 86 of the logging truck and moves the pin 172 out of the hole 170 against the force of the biasing springn 178. The coil 180 remains energized until the next time it is desired to mechanically lock the rotor 90 as describ d heretofore. A similar arrangement can be provided in the embodiment of FIGS. 1 to 3, inclusive, in which case the pin 172 may cooperate with holes in the periphery of the magnet 120 positioned at the bottom of the housing 120.

In FIG. 8 an alternative arrangement is provided for insuring that no neutrons are emitted during handling and storage of the sealed chamber 36. Referring to FIG. 8, a portable unit indicated generally at 190 is provided which may be fitted onto the bottom end of the sealed chamber 36 as this chamber is removed from the subsurface unit 10. More particularly, the unit 190 comprises an outer sleeve 192 which is provided with internal keyways 194 at one end thereof adapted to be fitted over vertically extending projections 196 provided in the base portion of the housing 102 which act as key portions to insure that the sleeve 192 can be inserted over the end of the housing 102 in only one orientation relative thereto. A bottom cap 198 for the sleeve 192 supports a battery 200 which is connected to two opposed electromagnet coils 202 and 204 mounted on the upper end of the sleeve 192. Accordingly, when the unit 190 is inserted over the motor housing 41 and is keyed to the housing 102 the electromagnets 202 and 204 are correctly positioned to establish a powerful electromagnetic field with the proper orientation with respect to the magnet 120 to hold the rotor 90 in the desired neutron off position. The switch 206 mounted on the sleeve 192 may then be closed to establish this magnetic field by energization of the electromagnets 202, 204. The sealed chamber 36 may then be completely removed from the subsurface and handled for storage and other purposes with the unit 190 energized and positioned on the end thereof to insure maximum safety for operating personnel. In this connection, it will be understood that the motor 40 and its mounting plate may be removed before the unit 190 is placed over the housing 41 so that the motor 40 may be used with other sealed chambers 36. A similar electromagnetic locking unit may also be provided for the embodiment of FIGS. 4 and 5, in which case the electromagnets 202 and 204 would be correctly positioned to cooperate with the magnet 120a to hold the rotor 90 in the neutron off position.

While there have been illustrated and described various embodiments of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. A pulsed radiation system comprising a sealed chamber, means defining a plurality of elongated source areas within said chamber, each of said source areas comprising a material which continuously emits charged particles, means defining a plurality of elongated target areas within said chamber, each of said target areas comprising a material which emits primary radiation when bombarded with charged particles emitted by one of said source material areas, means for positioning said target areas so that the exposed surfaces thereof lie in the surface of a first cylinder, means for positioning said source areas so that the surfaces thereof lie in the surface of a second cylinder which has the same axis as the first cylinder, control means for periodically and simultaneously exposing said target areas to charged particles emitted from said source areas, thereby periodically to develop bursts of primary radiation which have an intensity proportional to the length of said target areas which is exposed to said charged particles, said control means including a rotatable shaft within said sealed chamber, a permanent magnet secured to said shaft, electromagnetic locking means adapted to be positioned outside said chamber and arranged when energized to control the position of said permanent magnet, and means independent of said control means for energizing said electromagnetic locking means, said electromagnetic means being oriented relative to said chamber so that when said locking means is energized said permanent magnet is moved thereby to a position in which said source and target areas are positioned in face-to-face relationship.

2. A pulsed radiation system as set forth in claim 1, which includes a stationary permanent magnet within said sealed chamber and arranged to move said rotatable magnet to a source-off position in which said first member is positioned intermediate said predetermined angular positions when said electromagnetic control means is de-energized.

3. A pulsed radiation system comprising a sealed chamber, means defining a plurality of elongated source areas within said chamber, each of said source areas comprising a material which continuously emits charged particles, means defining a plurality of elongated target areas within said chamber, each of said target areas comprising a material which emits primary radiation when bombarded with charged particles emitted by one of said source material areas, means for positioning said target areas so that the exposed surfaces thereof lie in the surface of a first cylinder, means for positioning said source areas so that the surfaces thereof lie in the surface of a second cylinder which has the same axis as said first cylinder, control means for periodically and simultaneously exposing said target areas to charged particles emitted from said source areas, thereby periodically to develop bursts of primary radiation which have an intensity proportional to the length of said target areas which is exposed to said charged particles, and mechanical means for positively locking said control means in a non-emitting position in which said target areas are not irradiated by charged particles emitted from said source areas.

4. A pulsed radiation system comprising a sealed chamber, means defining a plurality of elongated source areas within said chamber, each of said source areas comprising a material which continuously emits charged particles, means defining a plurality of elongated target areas within said chamber, each of said target areas comprising a material which emits primary radiation when bombarded with charged particles emitted by one of said source material areas, means for positioning said target areas so that the exposed surfaces thereof lie in the surface of a first cylinder, means for positioning said source areas so that the surfaces thereof lie in the surface of a second cylinder which has the same axis as said first cylinder, control means for periodically and simultaneously exposing said target areas to charged particles emitted from said source areas, thereby periodically to develop bursts of primary radiation which have an intensity proportional to the length of said target areas which is exposed to said charged particles, said control means including a rotatable shaft within said sealed chamber, a permanent magnet secured to said shaft, and electromagnetic means adapted to be positioned outside said chamber and arranged to control the position of said permanent magnet, said electromagnetic means being oriented relative to said chamber so that said permanent magnet is moved thereby to a position in which said target areas are not irradiated by charged particles emitted from said source areas.

5. A pulsed radiation system comprising a sealed chamber, a first member mounted for rotation about an axis within said chamber, a second stationary member positioned within said chamber and surrounding said first member, means defining a plurality of cooperative source and target areas on said first and second members and extending parallel to said axis, each of said source areas comprising a material which continuously emits charged particles and each of said target areas comprising a material which emits primary radiation when irradiated with charged particles emitted by one of said source material areas, said source and target areas being so positioned on said first and second members that they are all in face-to-face relationship with one another at predetermined angular positions of said first member, thereby to provide a simultaneous emission of said primary radiation from said target areas at said predetermined angular positions which has an intensity proportional to the exposed length of said target areas, and mechnical locking means for positively locking said first member in a position in which said target areas are not irradiated by charged particles emitted by said source areas.

6. A pulsed radiation system comprising a sealed chamber, a first member mounted for rotation about an axis within said chamber, a second stationary member positioned within said chamber and surrounding said first member, means defining a plurality of cooperative source and target areas on said first and second members and extending parallel to said axis, each of said source areas comprising a material which continuously emits charged particles and each of said target areas comprising a material which emits primary radiation when irradiated with charged particles emitted by one of said source material areas, said source and target areas being so positioned on said first and second memberse that they are all in face-to-face relationship with one another at predetermined angular positions of said first member, thereby to provide a simultaneous emission of said primary radiation from said target areas at said predetermined angular positions which has an intensity proportional to the exposed length of said target areas, permanent magnet means mounted for rotation with said first member within said sealed chamber, and means positioned outside said chamber and responsive to rotation of said permanent magnet means within said chamber for developing a synchronizing pulse representative of each of said predetermined angular positions of said first member.

7. A pulsed radiation system comprising a sealed chamber, a first member mounted for rotation about an axis within said chamber, a second stationary member positioned within said chamber and surrounding said first member, means defining a plurality of cooperative source and target areas on said first and second members and extending parallel to said axis, each of said source areas comprising a material which continuously emits charged particles and each of said target areas comprising a material which emits primary radiation when irradiated with charged particles emitted by one of said source material areas, said source and target areas being so positioned on said first and second members that they are all in face-to-face relationship with one another at predetermined angular positions of said first member, thereby to provide a simultaneous emission of said primary radiation from said target areas at said predetermined angular positions which has an intensity proportional to the exposed length of said target areas, an electric motor having a rotor member mounted for rotation with first winding within said chamber and a stator winding positioned outside said chamber and cooperating with said rotor member through a wall portion of said sealed chamber, and means external to said chamber for energizing said stator winding so that said first member is rotated within said chamber.

8. A pulsed radiation system as set forth in claim 7, which includes a unidirectional source of potential within said chamber, and means operable from the exterior of said chamber for connecting said source to said rotor winding to provide starting torque therefor.

9. A pulsed radiation system as set forth in claim 7, wherein said primary radiation is fast neutrons and said sealed chamber is provided with wall portions which are substantially transparent to fast neutrons in the vicinity of said source and target areas.

10. A pulsed radiation system as set forth in claim 7, wherein said sealed chamber is provided with wall portions which are substantially non-magnetic in the vicinity of said rotor and stator windings.

* * * * *